(12) United States Patent
Knas et al.

(10) Patent No.: US 10,636,069 B1
(45) Date of Patent: Apr. 28, 2020

(54) BEACON-BASED MANAGEMENT OF QUEUES

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US)

(73) Assignee: Massachusetts Mutal Life Insurance Company, Springfield, MA (US)

( * ) Notice: Subject to any disclaimer, the term of this patent is extended or adjusted under 35 U.S.C. 154(b) by 414 days.

(21) Appl. No.: 15/466,542

(22) Filed: Mar. 22, 2017

Related U.S. Application Data

(60) Provisional application No. 62/312,583, filed on Mar. 24, 2016.

(51) Int. Cl.
*G06Q 30/00* (2012.01)
*G06Q 30/06* (2012.01)
*H04W 4/02* (2018.01)

(52) U.S. Cl.
CPC .......... *G06Q 30/0613* (2013.01); *H04W 4/02* (2013.01)

(58) Field of Classification Search
CPC ................. G06Q 30/0601–0645; H04W 4/02
See application file for complete search history.

(56) References Cited

U.S. PATENT DOCUMENTS

| | | |
|---|---|---|
| 9,392,406 B2 | 7/2016 | Houri |
| 9,578,596 B1 | 2/2017 | Rodoper et al. |
| 2003/0093167 A1* | 5/2003 | Sim ........ G06Q 10/02 700/90 |
| 2004/0091134 A1* | 5/2004 | Long ....... G08G 1/005 382/104 |
| 2010/0004005 A1 | 1/2010 | Pereira et al. |
| 2015/0141061 A1 | 5/2015 | Knantharaman |
| 2016/0013856 A1 | 1/2016 | Kikuchi |
| 2017/0018184 A1 | 1/2017 | Northrup et al. |
| 2017/0039490 A1* | 2/2017 | Argue ..... G06Q 10/02 |
| 2017/0053326 A1* | 2/2017 | SivasankaranNair ........ G06Q 30/0281 |
| 2017/0131884 A1 | 5/2017 | Jeon et al. |
| 2017/0295461 A1 | 10/2017 | Smith et al. |
| 2017/0352043 A1* | 12/2017 | Tineo ........ G06Q 30/0201 |

OTHER PUBLICATIONS

"Nafees, Azmat, Queuing Theory and Its Application: Analysis of the Sales Checkout Operation in ICA Supermarket, Jun. 2007, Department of Economics and Society, University of Dalarna, pp. 11-12, 26-31" (Year: 2007).*

* cited by examiner

*Primary Examiner* — William J Allen
*Assistant Examiner* — Maria S. P. Heath
(74) *Attorney, Agent, or Firm* — Eric L. Sophir; Foley & Lardner LLP

(57) ABSTRACT

Methods and systems disclosed herein utilize location signals received from beacons and other indoor positioning systems along with an application program on customer devices for better management of customer traffic in physical queues and virtual queues, specifically in environments such as airports, food courts, shopping malls, and amusement parks. These methods and systems also provide a customer with a token for his place in the queue on his mobile device, so he is free to continue with his activities until it is time for him to acquire a product or a service.

20 Claims, 5 Drawing Sheets

BEACON-BASED MANAGEMENT OF QUEUES

CROSS REFERENCE TO RELATED APPLICATION

This application claims priority to U.S. Provisional Patent Application Ser. No. 62/312,583, filed on Mar. 24, 2016, which are hereby incorporated by reference in their entirety.

This application is related to U.S. patent application Ser. No. 15/466,579, filed Mar. 22, 2017, which is incorporated by reference in its entirety.

TECHNICAL FIELD

The present application relates generally to systems, methods, and other embodiments associated with data transmittal between a beacon and a mobile device.

BACKGROUND

Waiting in queues is extremely tedious and time-consuming, whether it is for buying products, such as meals, shoes, or phones, or for benefiting from a service, such a haircut or a medical exam, or in places, such as the airport and the department of motor vehicles. Waiting in long queues without receiving any updates regarding anticipated time of service or information regarding the queue turnover discourages customers from return purchases or visits, and negatively affects the overall revenues and customer experience. Moreover, monitoring queues will facilitate the commercial entities providing the product or the service to better serve their customers, by increasing the number of sales assistants or service providers or providing real-time queue analytics communicating wait-times. These entities can also engage the customers in other experiences, such as providing discounts, signing them up for loyalty programs, conducting customer surveys, or visiting other sections of the facility.

Beacons are small, battery-friendly devices that send out low-voltage signals, such as Bluetooth Low-Energy (BLE), for a programmable distance between about a few cm to 40-50 m. Some smartphones can act as beacons. The frequency of sending the signal can also be programmable; for example, a signal can be sent every 100-400 milliseconds. Beacons can be placed strategically indoors or outdoors to perform many actions. There is a need to integrate the beacon technology and other indoor positioning systems, so that customers can sign-in using their mobile devices, track the queue turnover, and arrive at an appropriate time to acquire the product or service. Customers can also provide other inputs to the product or service provider, such as need for additional products or services, or questions regarding memberships or products or services. Systems for queue management also need to account for people standing in the physical queue, who do not use their mobile devices or log into the queue management application.

SUMMARY

The systems and methods disclosed herein attempt to address the above-mentioned shortcomings in the art and provide a variety of other benefits. The systems and methods described herein can create, maintain, transmit, and utilize data from customer devices and beacons.

Embodiments of the invention involve one or more beacons transmitting information at different ranges and other indoor positioning systems to provide more granular location information. Provided herein is a computer-implemented method for communicating with a customer device for management of a queue. The method includes receiving, by a server, a device identifier and location information from a customer device, the location information being associated to location of the customer device and determined from a plurality of location signals received from a plurality of beacons; verifying, by the server, the device identifier and the location information from the customer device as being associated with the customer device in a database configured to store a first plurality of records of a first plurality of preexisting queues and one or more records of a plurality of customer devices; retrieving, by the server, a second plurality of records associated to a second plurality of preexisting queues in the database, the second plurality of preexisting queues being selected from the first plurality of preexisting queues responsive to the current location of the customer device; generating, by the server, on a customer device a first graphical user interface configured to display a second plurality of preexisting queues; receiving, by the server, an input from the customer device requesting participation in a desired queue, the desired queue being selected from the second plurality of preexisting queues presented on the first graphical user interface; retrieving, by the server, a third plurality of records associated to one or more tokens in the database issued to one or more previous participants in the desired queue. Each of the one or more previous participants corresponds to a uniquely identified input requesting participation in the desired queue and received by the server ahead of receiving the input from the customer device; and each of the one or more tokens is assigned sequentially to each of the one or more previous participants successively entering the desired queue. The method further includes determining, by the server, an estimated processing time responsive to the one or more tokens being processed in a predetermined period of time; assigning, by the server, a next token to be associated with the consumer device, the next token being associated with the input requesting participation in the desired queue from the customer device and being sequentially next to the token assigned to last of the one or more previous participants in the entry queue; and generating, by the server, a second graphical user interface on the customer device configured to provide the estimated processing time and information associated to the next token. The plurality of preexisting queues can include a queue in a physical location. The plurality of preexisting queues can include a virtual queue. Each of the one or more previous participants corresponds to a uniquely identified input that can be obtained via a mobile application on a mobile device. At least one of the one or more previous participants corresponds to a uniquely identified input that can be obtained using an infrared detector. The information associated to the next token can include a number indicating a place in the desired queue. The information associated to the next token can include a haptic alert indicating user of the customer device to physically join the desired queue.

Embodiments of the invention involve a computer-implemented method for communicating with a customer device, which includes receiving, by a server, a device identifier associated to a customer device; verifying, by the server, the device identifier from the customer device as being associated with the customer device in a database configured to store one or more records of a plurality of customer devices and a first plurality of records of a first plurality of preexisting queues in a first plurality of physical locations defined by a plurality of location signals received from a plurality of beacons; receiving, by the server, from a first graphical user interface displayed at the customer device a query configured to identify one or more of a second plurality of preexisting queues in one or more of a second plurality of physical locations, wherein the second plurality of preexisting queues is selected from the first plurality of preexisting queues and the second plurality of physical locations is selected from the first plurality of physical locations; querying, by the server, the database containing the first plurality of records of the first plurality of preexisting queues to identify one or more of the second plurality of preexisting queues responsive to the query; generating, by the server, on the customer device a second graphical user interface configured to display the one or more of the second plurality of preexisting queues responsive to the query; receiving, by the server, an input from the customer device requesting participation in a desired queue, the desired queue being selected from the one or more of the second plurality of preexisting queues presented on the second graphical user interface; retrieving, by the server, a third plurality of records associated to one or more tokens in the database issued to one or more previous participants in the desired queue, wherein each of the one or more previous participants corresponds to a uniquely identified input requesting participation in the desired queue and received by the server ahead of receiving the input from the customer device; and each of the one or more tokens is assigned sequentially to each of the one or more previous participants successively entering the desired queue; determining, by the server, an estimated processing time responsive to the one or more tokens being processed in a predetermined period of time; assigning, by the server, a next token to be associated with the consumer device, the next token being associated with the input requesting participation in the desired queue from the customer device and being sequentially next to the token assigned to last of the one or more previous participants in the entry queue; and generating, by the server, a third graphical user interface on the customer device configured to provide the estimated processing time and information associated to the next token.

Additional features and advantages of an embodiment will be set forth in the description, which follows, and in part will be apparent from the description. The objectives and other advantages of the invention will be realized and attained by the structure particularly pointed out in the exemplary embodiments in the written description and claims hereof as well as the appended drawings. It is to be understood that both the foregoing general description and the following detailed description are exemplary and explanatory, and are intended to provide further explanation of the invention as claimed.

BRIEF DESCRIPTION OF THE DRAWINGS

The present disclosure can be better understood by referring to the following figures. The components in the figures are not necessarily to scale. The emphasis is instead placed upon illustrating the principles of the disclosure. In the figures, reference numerals designate corresponding parts throughout the different views.

DETAILED DESCRIPTION

Figure 1:
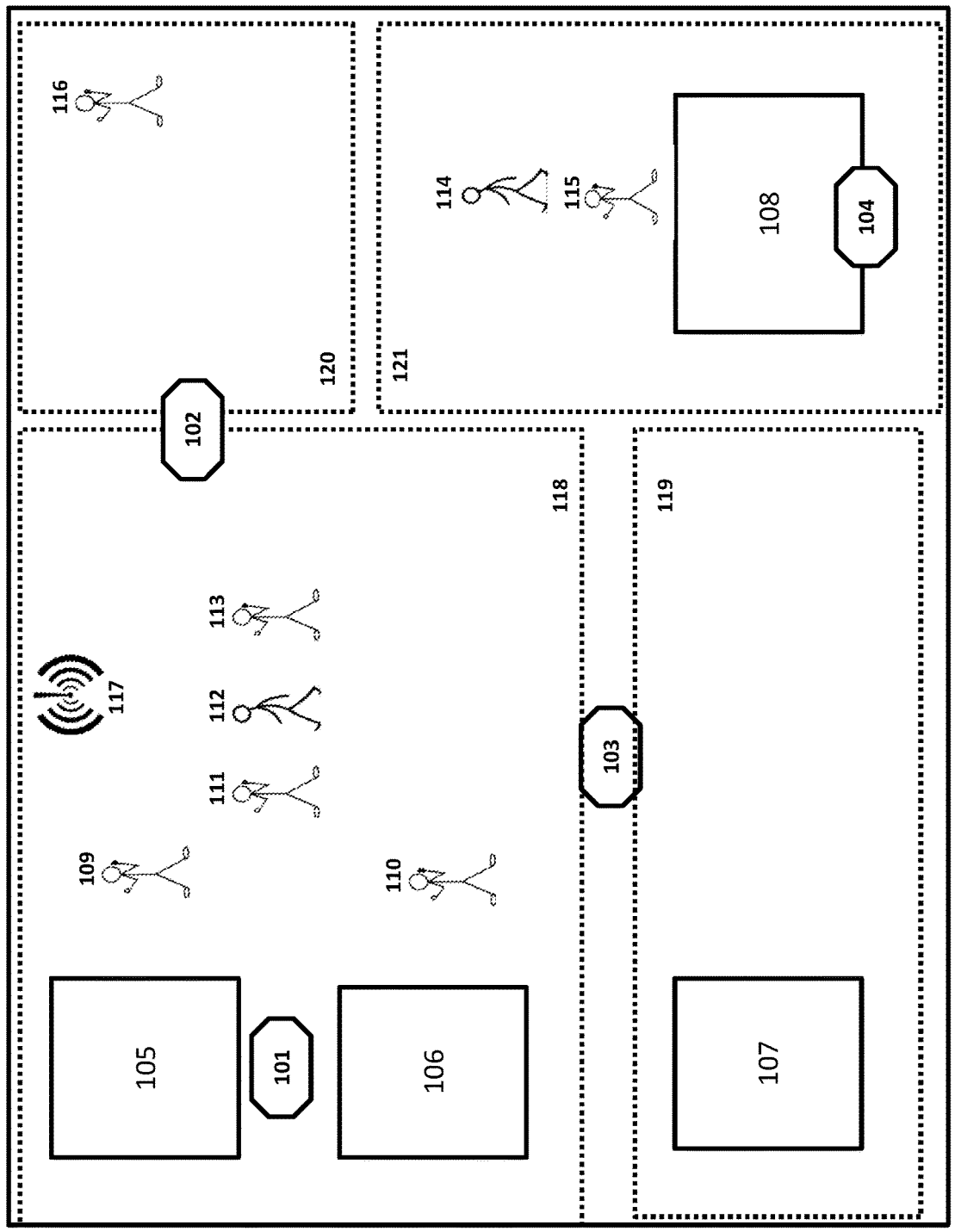
FIG. 1 illustrates an exemplary embodiment, where the beacons are utilized to generate micro-fenced service stations.

Reference will now be made in detail to the preferred embodiments, examples of which are illustrated in the accompanying drawings. The embodiments described herein are intended to be exemplary. One skilled in the art recognizes that numerous alternative components and embodiments may be substituted for the particular examples described herein and still fall within the scope of the invention.

The term "beacon" as used herein refers to any device configured to transmit a data packet, which is used by a receiving device to identify the transmitting device and compute the relative distance between the transmitting device and the receiving device. Beacons can be physical devices or virtual beacons. Beacons transmit small packets of data. Currently, beacons repeatedly transmit data packets in set intervals. There are several types of beacons and associated protocols available in the market such as iBeacon system (implemented by Apple®), AltBeacon (provided by Radius Networks), and EddyStone® (from Google®). The iBeacons and AltBeacons broadcast a data packet consisting mainly of following pieces of information—a Universally Unique Identifier (UUID), a major number, a minor number, and a transmission power level known as the "Broadcasting Power." These formats require external databases to give meaning to the beacon data packets. Receiving devices can approximate distance from the beacon by comparing the Broadcasting Power to the strength of the signal as received, known as the Received Signal Strength Indicator (RSSI). As these devices typically transmit that packet over and over again, this type of transmission defines the advertising functionality of beacons. These data packets are recognized only by special apps on the mobile phone of the customers. Beacons supporting the Eddystone format broadcast three different packets: a unique ID number, a URL address, and telemetrics based on sensors. They don't require an external database; instead they use web links to either link to data directly and could function via a two-way communication method. The Eddystone-URL frame type broadcasts information that can be used by a phone even without a specialized application. Virtual beacons may not require specialized devices and may use existing indoor positioning systems and the customer devices to deliver location-based information. Beacons can be configured to broadcast sensor data such as temperature and battery level, or even data gathered from other sensors in the room such as infra-red or thermal-imaging detectors. The term "device identifier" as used herein refers to a distinctive combination of numbers or characters associated with a particular computing device for the purpose of uniquely identifying that computing device to other devices and systems that are communicatively coupled to it. The term "de-identification" as used herein refers to the process of removing personal identifiers (i.e. phone numbers, names etc.) to mitigate privacy risks to individuals.

Data that has gone through the de-identification process and cannot reasonably be connected or associated to a customer or a specific computer or mobile device.

The term "location-aware devices" as used herein refers to computing devices that can passively or actively determine their location. Location signal data can be accessed and passed to the computing device in different ways. Location signals that can be detected by location-aware devices can be outdoor signals, indoor signals, or combinations thereof. Outdoor signals can be GPS, Wi-Fi, IP address, cell-tower triangulation, and customer-reported location. Indoor signals can be A-GPS, indoor positioning system (IPS), and Wi-Fi triangulation. The customer devices used herein are location-aware devices, such as mobile phones. Proximity to a location-aware device is determined by applying system-defined or user-defined rules regarding acceptable distance between the customer service stations and the customer device. Proximity can be restricted by preset latitude and longitude boundaries based on the customer device's location data. Proximity can also be determined at least in part based on a preset search radius around the geographic coordinates of the customer device as the center of the search area. Proximity can also be determined based on a combination of location signals to indicate specific buildings, floors, or facilities where products or services are available to the customer. The term "indoor positioning systems" as used herein refers to any system that attempts to provide an accurate position of a computing device inside of a covered structure. In addition to using location information from a beacon, certain embodiments can use triangulation to assess more accurately the location of a receiving device. For instance, the receiving device may receive signals from more than once source or of more than one type, e.g., Wi-Fi, BLE, and GPS. By relying on more than once source, the reliability and accuracy of the systems and methods disclosed herein are enhanced. Certain indoor positioning systems such as infrared devices, ultrasonic positioning systems, computer vision systems, radio frequency-based systems can also be utilized to determine the number of people standing in a physical queue. The term "micro-fenced location" as used herein refers to a virtual fenced location defined by indoor positioning systems. The boundaries of a micro-fenced location can be set by a customer or by an administrator of the queue management system.

A queue is a sequence in which services or products are made available to customers or by which a customer awaits his turn to be attended or proceed to a location. Moreover, a queue forms whenever current demand for a service or a product exceeds the existing capacity to serve. Such a situation is bound to occur in any system for which arrivals occur at varying times and service cycle or turnover times also vary. A queue discipline is the set of rules followed by the queue management server to process requests for products or services from various customers, thus representing the order in which customers are served. The most common service rule is first come, first served. However, the queue discipline can also account for various classes of customer priority or can be a last in, first out. Queues can be of an infinite or finite size or length. An infinite queue can be of any size with no upper limit or for limited products or services, the system can be set up to manage a queue of finite size. Queues can be set up based on physical line of customers waiting a service station or can be based on a virtual line of customers using their computing devices indicating their position in the queue, or can be a combination of both. By waiting in a virtual queue, the customer is free to attend to other matters in other physical locations. By being placed in a virtual queue, customers can engage in other productive and enjoyable activities until their time to be served arrives. Customers are interested in knowing at least two cycle times or rates of queue turnover. One, how long does it take for a customer to enter the queue, wait, and then complete the transaction. Second, how long does it takes to service a customer once they've reached the service station.

Disclosed herein are computer-implemented systems and methods for communicating with a customer device for management of a queue. The method includes receiving, by a server, a device identifier and location information from a customer device. The location information is associated to location of the customer device and determined from a plurality of location signals received from a plurality of beacons. In some embodiments, the location information is determined using other indoor positioning systems, such as infrared devices, ultrasonic positioning systems, computer vision systems, radio frequency-based systems, which can also be utilized to determine the number of people standing in a physical queue. In the next step, the server verifies the device identifier and the location information from the customer device as being associated with the customer device in a queue management database. This database is configured to store records relating to the preexisting queues, historical information regarding queues and process times for different sections of the facility, and records of a plurality of customer devices. In the next step, the server retrieves a subset of records associated to a subset of preexisting queues in the database. This subset of preexisting queues is those that are in the immediate proximity to the current location of the customer device. Then, the server generates on the customer device a first graphical user interface configured to display the subset of preexisting queues in the proximity of the customer device. In the next step, the server receives an input from the customer device requesting participation in a desired queue selected from the subset of preexisting queues presented on the first graphical user interface. In the next step, the server retrieves records associated to one or more tokens in the database issued to one or more previous participants in the desired queue. Each of the one or more previous participants corresponds to a uniquely identified input requesting participation in the desired queue and received by the server ahead of receiving the input from the customer device; and each of the one or more tokens is assigned sequentially to each of the one or more previous participants successively entering the desired queue. The method further includes determining, by the server, an estimated processing time responsive to the one or more tokens being processed in a predetermined period of time. In the next step, the server assigns a next token to be associated with the consumer device. The next token is associated with the input requesting participation in the desired queue from the customer device and is sequentially next to the token assigned to last of the one or more previous participants in the entry queue. In the next step, the server generates a second graphical user interface on the customer device configured to provide the estimated processing time and information associated to the next token. The plurality of preexisting queues can include a queue in a physical location. The plurality of preexisting queues can include a virtual queue. Each of the one or more previous participants corresponds to a uniquely identified input that can be obtained via a mobile application on a mobile device. At least one of the one or more previous participants corresponds to a uniquely identified input that can be obtained using an infrared detector. The information associated to the next token can include a number indicating a place in the desired queue. The information associated to the next token can include a haptic alert indicating to user of the customer device to physically join the desired queue.

In an embodiment, beacons are placed in specific areas of a facility, such as entrances, hallways, customer service desks, and checkout counters. FIG. 1 is an illustration of the various components of a queue management system in accordance with an exemplary embodiment. Here, the beacons 101, 102, 103, and 104 are placed in specific areas of a facility, such as between two customer service stations 105 and 106, or between 106 and 107, or in the entrance, or associated with a customer service station 108. Information associated to a diagrammatic representation of the physical floor plan is provided to the queue management database. A dataset containing strength and composition of the location signals from various beacons 101, 102, 103, and 104 throughout the entire floor is created and overlaid on the diagrammatic representation of the physical floor plan. Thus, granular portions of the physical floor plan are associated to strength and composition of the location signals from various beacons to create several micro-fenced locations, such as micro-fenced location 118 around customer service stations 105 and 106, micro-fenced location 119 around customer service station 107, micro-fenced location 121 around customer service station 108, or the large entrance 120 to the facility. In this embodiment, individual beacons need not be moved regularly due to floor plan changes or in facilities that have flexible, adaptable customer service stations. An exemplary facility can be an airport with several customer service counters to process baggage check-in processes or passenger check-in processes or security check-in processes. Another exemplary facility can be a shopping area with several customer service desks for checkout of goods, return of unwanted goods, or general questions regarding products. Another exemplary facility can be an amusement park with several rides or games or zones of interest to different age groups. Another exemplary facility can be a cafeteria or a food court with several food stations offering different cuisines or meal options. Another exemplary facility can be a convention hall with several trade or exhibitor and information booths and food and beverage service areas. So, in any of these examples, when the facility wants to combine two or more customer service stations to form a larger one, then a simple upload of the diagrammatic representation of the new physical layout of the area will be sufficient to recalibrate the queue management program to adapt to the new physical layout and create new micro-fenced locations.

Although the example illustrated in FIG. 1 is a facility with multiple customer service stations, these methods and systems can be implemented in a facility with a single service stations, such a flu-shot clinic with a single health practitioner administering the shots. These methods and systems can also be implemented in physical layouts that have several independent facilities in close proximity, such as a mall with several different stores and a food court nearby. Using beacons as shown in FIG. 1 results in a dynamic queue availability map with virtual geo-fenced locations. At a given point, a mobile application on a user device may detect different location signals with certain signal strengths. This set of location signals and their associated signal strengths represents a data point that is unique to that physical position. In other embodiments, the users can request the desired services, navigate the physical layout to the appropriate customer service station, and request friends to meet them at particular stations with the use of their devices.

For example, as illustrated in FIG. 1, a limited dataset containing strength and composition of the location signals from the beacons 101, 102, 103, and 104, and corresponding to the customer service stations 105 and 106 defines the micro-fenced location 118. This information along with information regarding customer service stations 105 and 106 is stored in a queue management database. When a customer 113 with a customer device is in the queue in the micro-fenced location 118, the receiver in the customer device of customer 113 detects the location signals from the beacons 101, 102, 103, and 104. The device communicates them along with a device identifier or a user identifier associated with the customer device of customer 113 to the queue management server via an application program. The unique combination of strength and composition of the location signals from device of customer 113 is used to determine that the device is within the micro-fenced location 118. The queue management server then queries the associated queue management database to retrieve information associated with queues for customer service stations 105 and 106, such as number of people in the physical and virtual queue, rate of queue turnover, number of service desks in operation, and the services available. This information is then presented back to the user of the customer device of customer 113 to decide if he wants to join or participate in the queue or come back another time. This information can also be presented to an administrator of the queue management system, who can decide to open station 107 to manage the queue.

FIG. 1 illustrates a feature of the exemplary embodiment, where users 109 and 110 access the queue management server using their devices. As they are processed by the customer service stations 105 and 106, the tokens issued to identify or maintain their place in the queue are marked as expired or are removed from the queue. Information, such as the time taken from their time of entry into the queue until their token expired is used to calculate estimated processing times. User 111 with a customer device is also alerted that he is the next in turn for service at service stations 105 or 106. This alert can be a visual, auditory, haptic, or a combination of such alerts. The user can receive a text, hear a ringtone, or feel a vibrating buzz to alert him that his turn is coming up and to be ready with required documents, such as receipts, coupons, boarding pass, or an identity document.

FIG. 1 is an illustration of several different customers interacting with the queue management system, such as customers 109, 110, 111, and 115 who have location-aware devices and are in the physical queue, and customers 113 and 116 who also have location-aware devices and are in the virtual queue or viewing data analytics from the queues. Certain customers 112 and 114 may not have the required queue management application on their mobile devices, or may not have a location-aware mobile device. To account for these customers, the facility is also enabled with several other detection systems 117 such as infrared devices, ultrasonic positioning systems, computer vision systems, and radio frequency-based systems, which are in communication with the queue management server and provide the information to determine the number of people standing in a physical queue. So, customer 113 is provided with a token indicating that he is the fifth person in line through interfaces such as those presented in FIGS. 3 and 4. The information associated with the queues can be viewed in any format or combination as required by the customer. In other instances, transmission of locations signals corresponding to micro-fenced location 120 to the queue management server can result in the user interfaces on device of customer 116 being configured to present a variety of other options, such as the size of the queues in front of the service stations 105, 106, 107, and 108, or different time option when the lines may be shorter, or a map showing the location of the various customer service stations, services offered, and fastest the route to get to the desired station. He can opt to conduct his business at station 107, as he waits in a virtual queue for services offered at service stations 105, 106, and 108. He can also decide to not use any of the queues and leave the facility or conduct his business at station 107 only.

Figure 2:
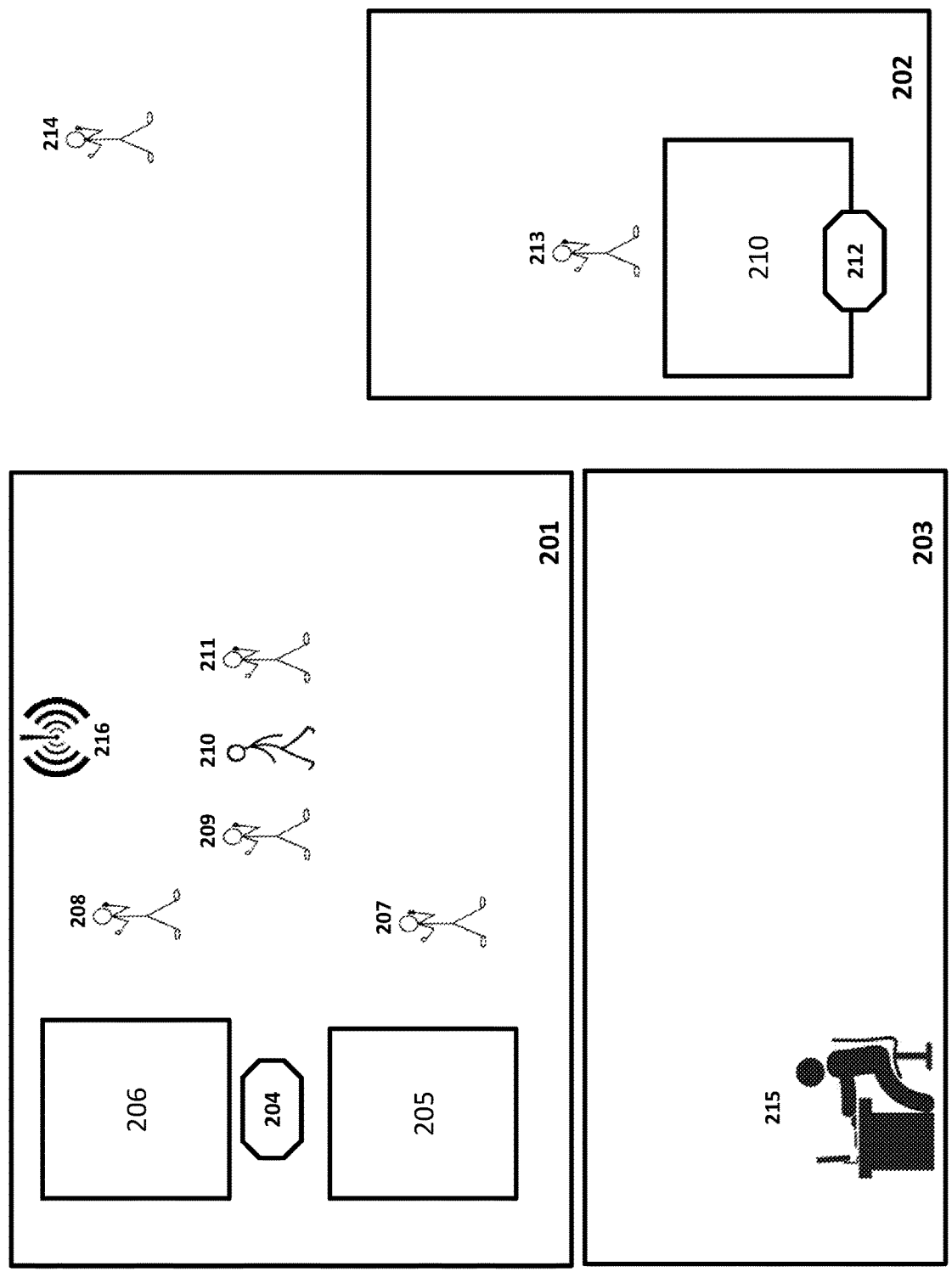
FIG. 2 illustrates an exemplary embodiment, where the method is implemented in certain locations equipped with beacons and other indoor positioning systems, and certain locations not equipped with such devices.

In an embodiment, beacons are placed only in specific areas of a facility, such as customer service desks, and checkout counters. FIG. 2 is an illustration of the various components of a queue management system in accordance with an exemplary embodiment. Here, physical locations 201 and 202 are equipped with beacons 204 and 212, while physical location 203 is not serviced by an indoor positioning system.

An exemplary facility can be a workspace where the banking facility and the cafeteria are equipped with indoor positioning systems, while individual workspaces are not. Another exemplary facility can be an airport with indoor positioning systems servicing several customer service counters processing baggage check-ins or passenger check-ins or security check-ins, while the workspaces of the airport employees are not equipped with indoor positioning systems. The user 215 in physical location 203 can interact with the queue management system to monitor queues, join any one of the queues himself, or run data analytics regarding the queues to adjust staff or product availability at the service stations 205, 206, and 210.

For example, as illustrated in FIG. 2, a limited dataset containing strength and composition of the location signals from the beacons 204 and 212, and indoor positions systems 216, and corresponding to the customer service stations 205 and 206 defines the physical location 118. This information along with information regarding customer service stations 205 and 206 is stored in a queue management database. When a customer 211 with a customer device is in the queue in location 201, the receiver in the customer device of customer 211 detects the location signals from the beacons 204 and 212, and indoor positions systems 216. The device communicates them along with a device identifier or a user identifier associated with the customer device of customer 211 to the queue management server via an application program. The queue management server then queries the associated queue management database to retrieve information associated with queues for customer service stations 205 and 206, such as number of people in the physical and virtual queue, rate of queue turnover, number of service desks in operation, and the services available. This information is then presented back to the user of the customer device of customer 211 to decide if he wants to join or participate in the queue or come back another time.

FIG. 1 also illustrates another features of the exemplary embodiment, where users 207 and 208 access the queue management server using their devices. As they are processed by the customer service stations 205 and 206, the tokens issued to identify or maintain their place in the queue are marked as expired or are removed from the queue. For example, the queue management server of FIG. 5 may display a user interface on an electronic device associated with the service stations 205 and 206 and receive confirmation from said electronic stations that users 207 and/or 208 have been services. Upon receiving this notification, the tokens are expired by the server. Information, such as the time taken from their time of entry into the queue until their token expired is used to calculate estimated processing times. User 209 with a customer device is also alerted that he is the next in turn for service at service stations 205 or 206. This alert can be a visual, auditory, haptic, or a combination of such alerts. The user can receive a text, hear a ringtone, or feel a vibrating buzz to alert him that his turn is coming up and to be ready with required documents, such as receipts, coupons, boarding pass, or an identity document.

FIG. 2 is an illustration of several different customers interacting with the queue management system, such as customers 207, 208, 209, and 213 who have location-aware devices and are in the physical queue, and customers 211 and 214 who also have location-aware devices and are in the virtual queue or viewing data analytics from the queues. Certain customers such as 210 may not have the required queue management application on their mobile devices, or may not have a location-aware mobile device. To account for these customers, the facility is also enabled with several other detection systems 216 such as infrared devices, ultrasonic positioning systems, computer vision systems, and radio frequency-based systems, which are in communication with the queue management server and also provide the information to determine the number of people standing in a physical queue. So, customer 211 is provided with a token indicating that he is the fifth person in line through interfaces such as those presented in FIGS. 3 and 4. The information associated with the queues can be viewed in any format or combination as required by the customer. In other instances, when user 214 logs in to the mobile application on his device, he can access the queue management server through user interfaces on his device. These interfaces presented to customer 214 can be configured to present a variety of options, such as the size of the queues in front of the service stations 205, 206, and 210, or different time option when the lines may be shorter, or a map showing the location of the various customer service stations, services offered, and fastest the route to get to the desired station. He can opt to conduct his business at station 210, as he waits in a virtual queue for services offered at service stations 205 or 206. He can also decide to not use any of the queues and leave the facility or conduct his business at station 210 only.

The user 215 in physical location 203 can interact with the queue management system to monitor queues and indicate an intent to join the queues at the service stations 205 and 206. The token assigned to him can indicate a specified appointment time for user 215 when products or services will be available to him at service stations 205 and 206. When provided with information such as physical layouts of the entire space or address information, the queue management system can also calculate the time required for user 215 to reach service stations 205 and 206 and alert him accordingly. In an exemplary embodiment, where the physical location 201 is a restaurant, the queue management server can track availability of tables at location 201, and alert users 214 and 215 accordingly. The tokens issued to users 214 and 215 can be static and indicate their place in the queue or can be dynamic that adjusts to their relative positions. So if user 214 is stalled or delayed, then user 215 can be serviced ahead of user 214. In an exemplary embodiment, where the physical location 201 is an airport, the queue management server can track length of queues and rate of queue turnover at baggage check-in stations 205 and 206, and also track length of queues and rate of queue turnover at security check-in 210, and provide this information to users 209, 211, 214 and 215 accordingly. The tokens issued to users 214 and 215 can be static and indicate their place in the queue or can be dynamic that adjusts to their relative positions. So if user 214 is stalled or delayed, then user 215 can be serviced ahead of user 214. Alternatively, if user 214 decides to skip stations 205 and 206, and head directly to station 210, then the tokens issued to user 215 can be adjusted accordingly.

Figure 3:
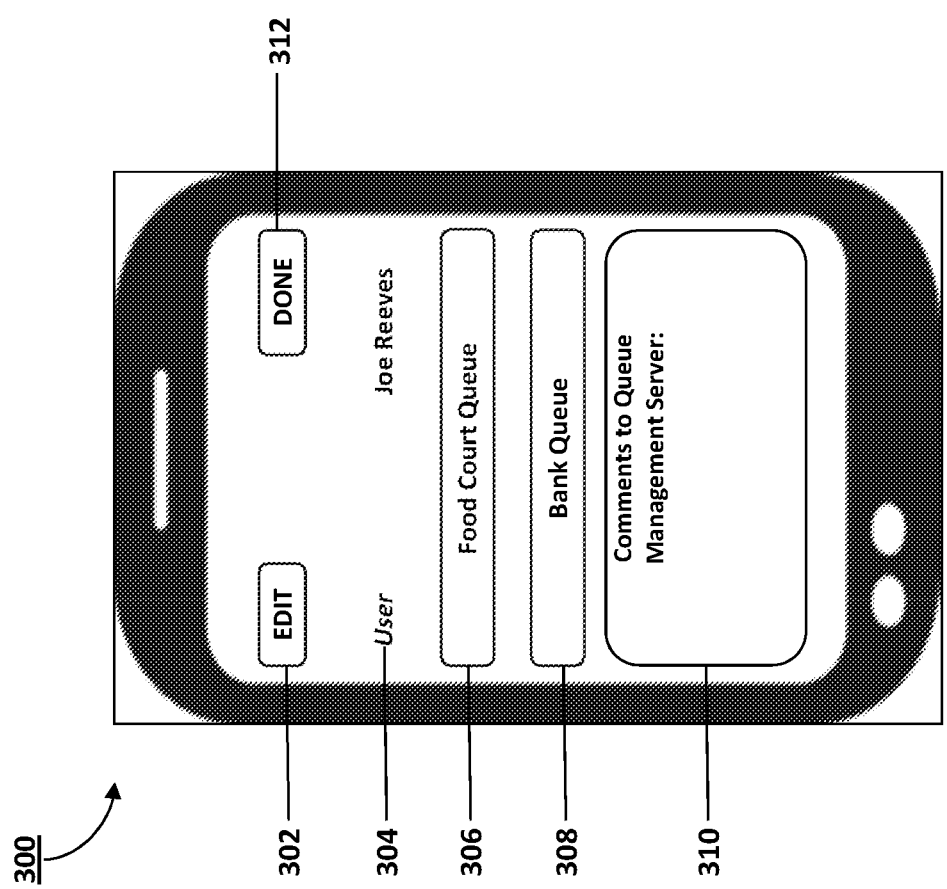
FIG. 3 is an exemplary embodiment of the client-side application presenting a graphical user interface on a customer device, in accordance with an exemplary embodiment.
Figure 4:
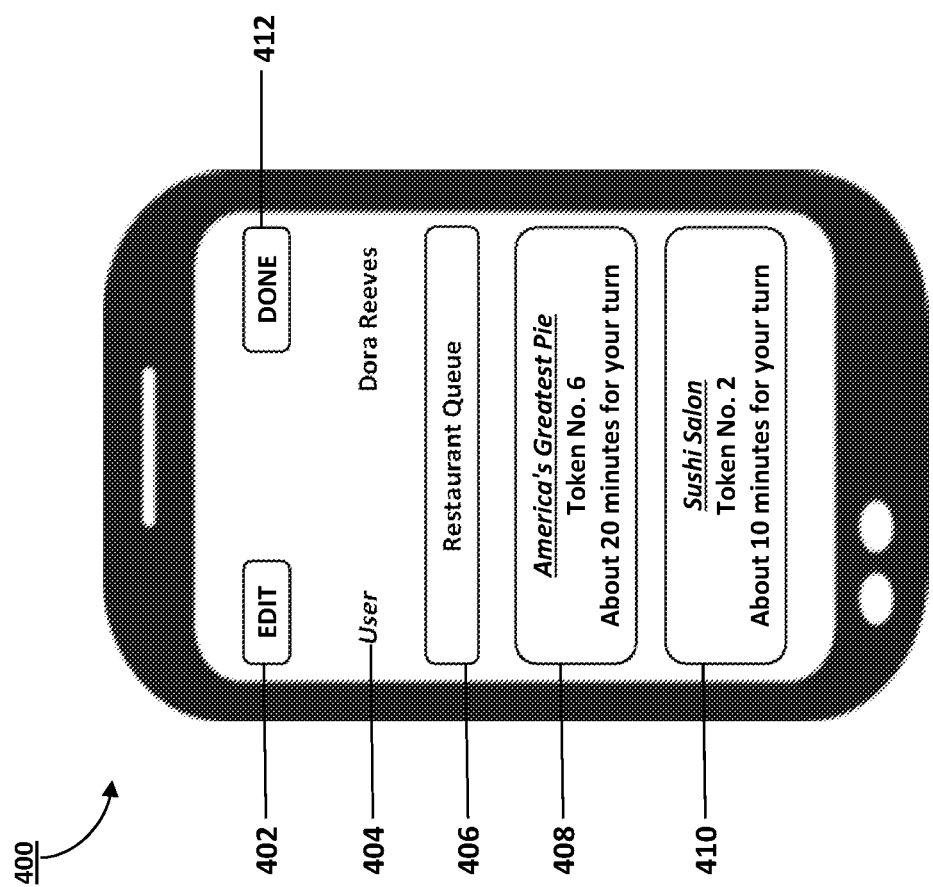
FIG. 4 is an exemplary embodiment of the client-side application presenting a graphical user interface on a customer device, in accordance with an exemplary embodiment.

FIG. 3 is an exemplary embodiment of the client-side application presenting a graphical user interface on a customer device, in accordance with an exemplary embodiment. Several clickable buttons with texts or images or both enable the customer to click or touch anywhere within the confines of such buttons and be directed to another defined interface. These buttons serve as links to other interfaces, or navigation tools to generate user interfaces responsive to the requests coded to the buttons tools or user interfaces generated from records stored in the queue management database. In certain instances, these buttons can be configured to access records stored in the queue management database. A customer sets up his profile including username 304 with his queue preferences on the app on his device 300, such that the app automatically makes queue suggestions based upon those preferences. For example, if the customer has set his profile for the food court queue to be operational only during a predetermined lunchtime between 11:00 AM and 2:00 PM, then the app connects to the queue management server to query the queue management database for appropriate queue options available only at that time. For example, the clickable button 306 titled "Food Court Queue" leads the customer to an interface, such as shown in FIG. 4, where he can enter or edit or view information such as the length of the queue at his favorite restaurants or the rate of queue turnover in those locations, or meal choices, and other details available for viewing by customers, such as special discounts or special meals of the day. The clickable button 308 titled "Bank Queue" leads the customer to an interface where he can enter, edit, or view the queue information associated with his financial institutions of choice, such as the queue information associated with the bank teller or with his investment banker during his lunch hour. The field 310 titled "Comments to Queue Management Sever" permits the customer to leave messages for customization of his interface or contact the server if he has any issues. Also shown here are controls to edit the information 302 provided through the interface or to indicate that the user is done with the session for now 312. Not shown herein are a number of commonly used controls, such as controls that are used to maximize, minimize, resize, and close user interface on device 300. User interfaces can also include other controls such as scrollbars and navigational controls (not shown). Navigation controls allow a consumer to toggle between different user interfaces of the mobile application, such as from the user interface shown in FIG. 3 to other interfaces, for example interfaces that display specific queue information as shown in FIG. 4. It should be understood that interfaces generated or updated by mobile application can include less fields, more fields, or different fields depending on the desired goals of the customer. The mobile application can also provide one or more interfaces with one or more icons, screen layouts, and other visual and verbal cues to communicate with the queue management system. The mobile application can also provide one or more interfaces with one or more icons, screen layouts, and other visual and verbal cues for the customer to manage the information associated with the queues and his preferences for services.

FIG. 4 is an exemplary embodiment of the client-side application presenting a graphical user interface on a customer device 400, in accordance with an exemplary embodiment. Several clickable buttons with texts or images or both enable the customer to click or touch anywhere within the confines of such buttons and be directed to another defined interface. These buttons serve as links to other interfaces, or navigation tools to generate user interfaces responsive to the requests coded to the buttons tools or user interfaces generated from records stored in the queue management database. In certain instances, these buttons can be configured to access records stored in the queue management database. A customer sets up his profile including username 404 with his queue preferences on the app on his device 400, such that the app automatically makes queue suggestions based upon those preferences. For example, if the customer has set his profile for a restaurant queue to be operational during a predetermined dinnertime between 6:00 PM and 8:00 PM, then the app connects to the queue management server to query the queue management database for appropriate queue options available only at that time. For example, the clickable button 406 titled "Restaurant Queue" presents the customer with the token information and the wait times at his two favorite restaurants. These buttons 408 and 410 can be clickable, such that clicking them reserves his place in a particular queue, or can be connected to his contact list, so that he can alert his dinner party that this is the token for the party to meet at a particular restaurant. Also shown here are controls to edit the information 402 provided through the interface or to indicate that the user is done with the session for now 412. Not shown herein are a number of commonly used controls, such as controls that are used to maximize, minimize, resize, and close user interface on device 400. User interfaces can also include other controls such as scrollbars and navigational controls (not shown). Navigation controls allow a consumer to toggle between different user interfaces of the mobile application, such as from the user interface shown in FIG. 4 to other interfaces, for example interfaces that display specific queue information as shown in FIG. 3. It should be understood that interfaces generated by mobile application can include less fields, more fields, or different fields depending on the desired goals of the customer. The mobile application can also provide one or more interfaces with one or more icons, screen layouts, and other visual and verbal cues to communicate with the queue management system. The mobile application can also provide one or more interfaces with one or more icons, screen layouts, and other visual and verbal cues for the customer to manage the information associated with the queues and his preferences for services.

Figure 5:
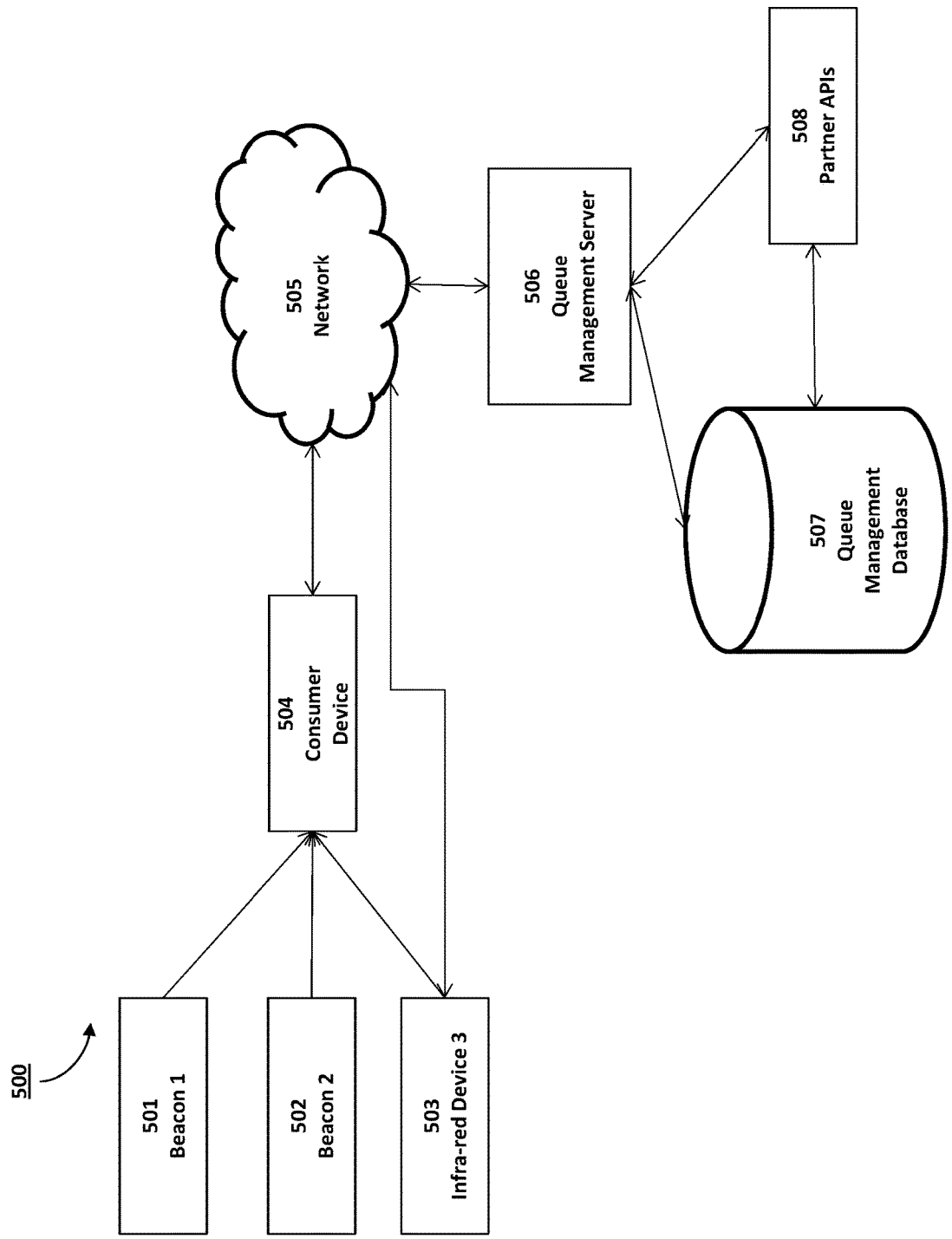
FIG. 5 is an illustration of the various components of a queue management system in accordance with an exemplary embodiment.

Certain embodiments include a system for communicating information from a queue management database to a customer device. FIG. 5 is a block diagram illustrating a system 500 containing a queue management server, according to an embodiment. A plurality of beacons, for example 501 and 502, and indoor positioning devices such as infrared device 503 transmit a plurality of location signals that are received by a customer device 504. The device 504 then transmits a device identifier and the plurality of location signals from the plurality of beacons, for example 501 and 502, and indoor positioning devices such as infra-red device 503, via a network 505 to one or more servers constituting the queue management server 506. The system includes a queue management database 507 hosted by or communicatively coupled to the queue management server 506. The queue management database 507 is configured to store one or more records of a plurality of customer identifiers, unique device identifiers, individual queue management profiles, individual queue preferences, calendars, preferred restaurant choices, preferred airport terminals, preferred financial institution, their locations, and all combinations thereof.

The customer device 504 can be any mobile location-aware computing devices, e.g., wearables, smartphone or tablets, which can receive a wireless signal from one or more transmitters of location signals. When the customer device 504 receives the location signals, it can process it using one or more mobile applications in communication with one or more servers constituting the queue management server 506. Mobile applications of the queue management system can be implemented as software that can be downloaded and installed on the customer device 504. Examples of mobile application are GUI applications that may be available at, downloaded, and installed from a public software app stores or digital application distribution platforms, such as Apple iTunes®, Google Play® Store and Amazon.com®, among others. In these embodiments, mobile application includes the following exemplary functions: allowing the customer to create and manage a customer account, queue profiles, and other preferences within the queue management system 500; allowing the customer to see the available queue choices associated with particular physical locations or micro-fenced locations, allowing the customer to receive communications such as calendar notifications, e-mails or text messages from the queue management system 500; and allowing the customer to see updates or modifications or other status reports or options for further action and instructions from the queue management system 500.

The mobile application can have a landing graphical customer interface or an introductory interface where the customer enters his credentials to the queue management system 500. Upon entering proper credentials, the customer is presented with graphical customer interfaces, such as shown in FIGS. 3 and 4 that present, collect, and communicate information to and from the queue management system 500. One or more customer-side and server-side technologies or combinations thereof can be implemented to ensure that the graphical customer interfaces are dynamically generated based on the updates to the records in the queue management database 507. Content for personalized web-based or an app-based interfaces can be dynamically generated on customer devices, based on updates to the queue management database 507 and plurality of inputs from the location-aware devices. The information presented to the customer devices can be subject to de-identification, depending on the security levels or the "need-to-know" level associated with various customers of the queue management system 500. Data communicated between the various devices, servers, and other components of the system is encrypted, stored, decrypted, and distributed using one or more firewalls, antivirus and antiphishing software, file encryption protocols, and other encryption software.

In some embodiments, the UUIDs or unique identifiers of the beacons 501 and 502 must be programmed and associated with particular locations where they are installed. The beacons 501 and 502 continuously broadcast information, for example in the form of data strings, at a pre-determined interval, like a heartbeat of data broadcasts, which are then captured by one or more applications on the customer devices. The data fields in these broadcasted data strings could include an identifier of an individual beacon, location of the beacon in the office space, time of day, and any information designed for consumption by the customer devices.

A queue management server 506 may be any computing device, including one or more servers, comprising non-transitory machine-readable storage media, processors, and software modules capable of performing various tasks and processes described herein. In an embodiment, an application can be downloaded to a customer device that is able to communicate with the server. The application can be created and maintained by same party who maintains the queue management server 506. In certain embodiments, component features of the server may reside on separate physical devices.

The queue management database 507 is a body of information associated with the queues in any one or more of the facilities visited by a customer or otherwise available for his review, and organized as records. This database can comprise information regarding individual customers such as available customer devices, individual queue management profiles, individual queue preferences, calendars, preferred restaurant choices, preferred airport terminals, preferred financial institution, their locations and payment information, and also shared resources such as information regarding restaurants, amusement parks, airports, clinics, banks, other customer reviews, online event calendars, and available discounts and special event information. Information in these databases can be stored or retrieved dynamically using appropriate storage management software. For example, a database in some embodiments can be a database containing information regarding the beacons 501, 502, and 503, their locations, online calendars associated to them, or any information for the customer. The database can be part of the server, however, in some embodiments the database may reside on a different computing device than the server (i.e., a distributed computing environment).

The system includes a network 505, which is any common communication architecture that facilitates communication between computing devices. For example, the computing devices communicating over the network 505 would be the one or more receiving devices, plurality of beacons, for example 501 and 502, and indoor positioning devices such as infra-red device 503, a network server, and one or more databases. One having ordinary skill in the art would appreciate that the network may be the Internet, a private intranet, or some hybrid of the two. The network 505 may be comprised of any combination of devices and protocols capable of facilitating communication between computing devices. Non-limiting examples of devices comprising the network 505 may include routers, switches, hubs, firewalls, proxy servers, telecommunications trunks, and the like. Non-limiting examples of protocols employed by the network may include TCP/IP, Wi-Fi, Bluetooth®, 3G, Wi-Max, and the like. Wireless communication between one or more customer devices and one or more transmitters may be performed with a relatively short-range wireless communication protocol such as Wi-Fi, Bluetooth, high frequency systems, or other relatively localized wireless communication protocols.

The plurality of beacons, for example 501 and 502, and indoor positioning devices may be any computing or other electronic device comprising a processor and a wireless interface capable of transmitting signals to a receiving device. The signals may contain binary data, and the binary data may represent various types of data and/or information for the customer device 504 to consume and implement. The components of the customer device 504 receiving the signals, may translate the signals into useful binary data triggering various tasks and process according to the application executed by the customer device 504. The plurality of beacons, for example 501 and 502, and indoor positioning devices may implement any suitable components for wirelessly communicating with the customer device 504, or other receivers. The technological components may include wireless networking hardware and the related protocols, such as a Bluetooth low energy (BLE) interface chip and the Bluetooth wireless communication protocols.

Although FIG. 5 shows only a limited number of beacons, for example 501 and 502, and indoor positioning devices, it should be appreciated that more transmitters may be communicatively coupled to one another, over a wired and/or wireless network of transmitters. That is, locations, such as brick-and-mortar office buildings, schools, campuses of multiple buildings, governmental or administrative buildings, and the like, may implement localized networks of beacons to transmit and/or collect data, across a broader area. Furthermore, although the exemplary system described in FIG. 5 describes stationary beacons 501 and 502, it should also be appreciated that beacons 501 and 502 may be any suitable stationary or mobile devices that are capable of performing the various tasks and processes described herein. Thus, a collection of beacons 501 and 502 can comprise a combination of mobile and stationary devices. It should also be appreciated that, although FIG. 5 describes beacons 501 and 502 performing one-way signal transmissions, beacons 501 and 502 may be capable of two-way communications (i.e., collecting data from signals transmitted by receiving devices), and may be capable of a number of functions or execute a variety of software modules. Non-limiting examples of beacons 501 and 502 may include an iBeacon, AltBeacon, and EddyStone, a wireless router, a cellular phone, a tablet, a wearable, a workstation, or any other suitable computing or other electronic device. The data strings from the beacon can comprise both constant identifiers that do not change with every broadcast and dynamic identifiers that change with every broadcast.

In some instances, certain plurality of records can be provided by a partner application programmable interfaces (API) 508 associated to the queue management server 506 configured to process records associated with queues available at one or more facilities. The APIs 308 can be any Representational State Transfer Application Programming Interface (REST API) that controls and manages one or more APIs. In these embodiments, API provides web services to one or more mobile applications installed on the computing devices. Examples of web services include showing data on a website, uploading large amounts of data that will later be consumed by a mobile app, downloading data to run custom analytics, exporting data, and the like. APIs are commonly a collection of one or more computing protocols and/or routines that indicate a software program's or software service's functions, and each function's requisite inputs. The APIs may be used to query and fetch data from databases, or pass information to other services or programs. For example, APIs may be used to communicate information and instructions to cloud-based services regarding the queues associated with particular locations. APIs may be used to facilitate communications between a plurality of servers underlying web-based or network-based services used by the customers to monitor, access, or manage queue choices. For example, the queue management system 500 can interact with restaurant services such as OpenTable®, UrbanSpoon®, or Yelp®, or access their APIs to provide an integrated service.

Embodiments of the invention present several advantages over existing systems. The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," and "etc.," are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. The invention may be practiced with other computer system configurations, including hand-held devices, multiprocessor systems, microprocessor-based or programmable customer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein. While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for communicating with a customer device, the method comprising:
    periodically monitoring, by a server, locations of a plurality of electronic devices comprising at least the customer device by receiving a device identifier and location information from each electronic device, the location information being associated with location of each electronic device and determined from a plurality of location signals received, by each electronic device, from a plurality of beacons configured to periodically transmit the location signals within a predetermined location;
    verifying, by the server, the device identifier and the location information from the customer device as being associated with the customer device in a database configured to store a first plurality of records of a first plurality of preexisting queues and one or more records of a plurality of customer devices;
    upon the customer device being located within the predetermined location, retrieving, by the server, a second plurality of records associated with a second plurality of preexisting queues in the database, the second plurality of preexisting queues being selected from the first plurality of preexisting queues responsive to the predetermined location;
    generating, by the server, on the customer device a first graphical user interface configured to display a second plurality of preexisting queues;
    receiving, by the server, an input from the customer device requesting participation in a desired queue, the desired queue being selected from the second plurality of preexisting queues presented on the first graphical user interface;
    retrieving, by the server, a third plurality of records associated with one or more tokens in the database issued to one or more electronic devices corresponding to previous participants in the desired queue, wherein
        each of the one or more previous participants corresponds to a uniquely identified input requesting participation in the desired queue and received by the server before receiving the input from the customer device; and
        each of the one or more tokens is assigned sequentially to each of the one or more previous participants successively entering the desired queue;
    determining, by the server, an estimated processing time responsive to one or more tokens being processed in a predetermined period of time, wherein the server monitors a time duration corresponding to a time that each token entered the desired queue until each token was processed to calculate the estimated processing time;
    assigning, by the server, a next token to be associated with the customer device, the next token being associated with the input requesting participation in the desired queue from the customer device and being sequentially next to the token assigned to last of the one or more previous participants in the entry queue; and
    generating, by the server, a second graphical user interface on the customer device configured to provide the estimated processing time and information associated with the next token.

2. The computer-implemented method of claim 1, wherein the plurality of preexisting queues comprises a queue in a physical location.

3. The computer-implemented method of claim 1, wherein the plurality of preexisting queues comprises a virtual queue.

4. The computer-implemented method of claim 1, wherein each of the one or more previous participants corresponds to a uniquely identified input obtained via a mobile application on a mobile device.

5. The computer-implemented method of claim 1, wherein at least one of previous participants corresponds to a uniquely identified input obtained using an infra-red detector.

6. The computer-implemented method of claim 1, wherein the information associated with the next token comprises a number indicating a place in the desired queue.

7. The computer-implemented method of claim 1, wherein the information associated with the next token comprises a haptic alert indicating user of the customer device to physically join the desired queue.

8. The computer-implemented method of claim 1, wherein the data record associated with the one or more tokens in the database issued to one or more previous participants in the desired queue are modified as expired once the previous participants have been processed.

9. The computer-implemented method of claim 8, wherein the expiration of the one or more tokens in the database issued to one or more previous participants is in response to receiving, by the server, from an electronic device associated with a service station associated with the desired queue, an indication that the participants have been processed.

10. The computer-implemented method of claim 1, wherein the second graphical user interface on the customer device is configured to display a message to be transmitted to a queue management server.

11. A computer system comprising:
a server configured to:
periodically monitor location of a plurality of electronic devices comprising at least a customer device by receiving a device identifier and location information from each electronic device, the location information being associated with location of each electronic device and determined from a plurality of location signals received, by each electronic device, from a plurality of beacons configured to periodically transmit the location signals within a predetermined location;
verify the device identifier and the location information from the customer device as being associated with the customer device in a database configured to store a first plurality of records of a first plurality of preexisting queues and one or more records of a plurality of customer devices;
upon the customer device being located within the predetermined location, retrieve a second plurality of records associated with a second plurality of preexisting queues in the database, the second plurality of preexisting queues being selected from the first plurality of preexisting queues responsive to the predetermined location;
generate on the customer device a first graphical user interface configured to display a second plurality of preexisting queues;
receive an input from the customer device requesting participation in a desired queue, the desired queue being selected from the second plurality of preexisting queues presented on the first graphical user interface;
retrieve a third plurality of records associated with one or more tokens in the database issued to one or more electronic devices corresponding to previous participants in the desired queue, wherein
each of the one or more previous participants corresponds to a uniquely identified input requesting participation in the desired queue and received by the server before receiving the input from the customer device; and
each of the one or more tokens is assigned sequentially to each of the one or more previous participants successively entering the desired queue;
determine an estimated processing time responsive to the one or more tokens being processed in a predetermined period of time, wherein the server monitors a time duration corresponding to a time that each token entered the desired queue until each token was processed to calculate the estimated processing time;
assign a next token to be associated with the customer device, the next token being associated with the input requesting participation in the desired queue from the customer device and being sequentially next to the token assigned to last of the one or more previous participants in the entry queue; and
generate a second graphical user interface on the customer device configured to provide the estimated processing time and information associated with the next token.

12. The computer system of claim 11, wherein the plurality of preexisting queues comprises a queue in a physical location.

13. The computer system of claim 11, wherein the plurality of preexisting queues comprises a virtual queue.

14. The computer system of claim 11, wherein each of the one or more previous participants corresponds to a uniquely identified input obtained via a mobile application on a mobile device.

15. The computer system of claim 11, wherein at least one of previous participants corresponds to a uniquely identified input obtained using an infra-red detector.

16. The computer system of claim 11, wherein the information associated with the next token comprises a number indicating a place in the desired queue.

17. The computer system of claim 11, wherein the information associated with the next token comprises a haptic alert indicating user of the customer device to physically join the desired queue.

18. The computer system of claim 11, wherein the data record associated with the one or more tokens in the database issued to one or more previous participants in the desired queue are modified as expired once the previous participants have been processed.

19. The computer system of claim 18, wherein the expiration of the one or more tokens in the database issued to one or more previous participants is in response to receiving, by the server, from an electronic device associated with a service station associated with the desired queue, an indication that the participants have been processed.

20. The computer system of claim 11, wherein the second graphical user interface on the customer device is configured to display a message to be transmitted to a queue management server.

* * * * *